May 8, 1962     C. J. FITCH     3,034,112
VISUAL INDICATOR
Filed Dec. 19, 1957
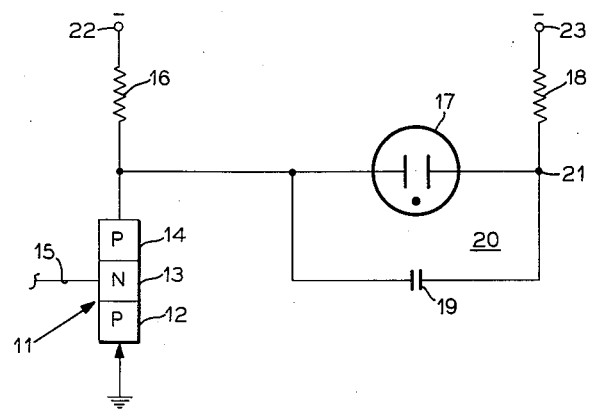
INVENTOR.
CLYDE J. FITCH
BY *John P. Darity*
ATTORNEY ়
3,034,112
VISUAL INDICATOR
Clyde J. Fitch, Endicott, N.Y., assignor to International Business Machines Corporation, New York, N.Y., a corporation of New York
Filed Dec. 19, 1957, Ser. No. 703,823
1 Claim. (Cl. 340—248)

This invention relates to indicating devices and particularly to such devices for indicating low voltages such as produced at the output of a transistor.

In many machines it is desirable to provide means for giving a visual indication of the electrical state of circuit elements employed therein. For example, in electronic data processing machines, it is often necessary to provide visual displays of data stored in certain storage elements. Neon lamps have proven quite satisfactory for this purpose in vacuum tube circuits since sufficient voltage is available to directly operate these neon lamps.

However, in transistor circuits and particularly in junction type transistor circuits only low potential levels are directly available. It is thus desirable to make use of these low levels to directly operate visual indicators if the structure provided for indicating purposes is to be kept at a minimum. The voltage signals available from transistors are often of only a few volts in magnitude, insufficient to fire a neon tube and often insufficient when subtracted from the firing potential to extinguish the tube if fired.

An object of this invention is to provide an improved visual indicator for low voltages.

Another object is to provide an improved visual indicator indicating the electrical condition of a transistor.

Another object is to provide an improved circuit for operating a neon type glow lamp under the control of a transistor.

A further object is to provide an improved circuit for igniting and extinguishing a neon type glow lamp under the control of a transistor.

According to a preferred embodiment of the invention a neon glow lamp is biased just under its ignition potential by a source of potential. The load resistor of a transistor is placed in series with the source of potential such that when the transistor is conducting the voltage drop across the load resistor aids the source of potential to ignite the neon glow tube. The glow tube serves as one element of a relaxation oscillator such that when the transistor is conducting the glow tube is rapidly ignited and extinguished with each oscillation. The frequency may be made sufficiently high so that the flicker is not noticeable to the human eye. Since the glow tube is extinguished on each oscillation the removal of the voltage drop across the load resistor effected by cutting off conduction in the transistor will prevent further ignition of the glow tube. The glow tube thus gives a visual indication of the electrical state of the transistor.

Other objects of the invention will be pointed out in the following description and claim and illustrated in the accompanying drawings, which disclose, by way of examples, the principle of the invention and the best mode, which has been contemplated, of applying that principle.

The drawing shows a schematic circuit diagram of an indicator constructed in accordance with the present invention as applied to a transistor circuit.

A transistor 11 is shown operating alone although this transistor will normally be part of a more complex circuit, for example, part of a trigger circuit. Transistor 11 has a grounded emitter electrode 12, a base electrode 13 to which input signals from line 15 may be applied, and a collector electrode 14 connected through a load resistor 16 to a negative source of potential at terminal 22. The negative potential at terminal 22 may, for example, be around minus ten volts with respect to ground while the input signals from line 15 may go from a slightly positive normal level to a negative level with respect to ground. With a positive potential applied to the base 13 of transistor 11, the transistor is non-conductive and thus collector 14 assumes a potential very nearly that of terminal 22. When, however, a negative potential is applied to base 13, the transistor becomes conductive and collector 14 assumes a potential very nearly that of emitter 12, the voltage drop being then primarily across resistor 16. Thus collector 14 may be controlled by line 15 to assume the potential level of terminal 22 or the potential level of emitter 12 depending on the potential of line 15.

A glow discharge lamp 17 is connected between collector 14 and a negative source of potential at terminal 23 through a rather large resistor 18. Glow discharge lamp 17 may, for example, be a neon tube of the NE76 type which type has an ignition point of 72 volts ±4 volts. Terminal 23, may, for this example of a glow discharge tube, be at a fixed potential of around minus seventy-seven volts.

A condenser 19 is connected across lamp 17 to form a relaxation oscillator indicated generally at 20.

Assuming transistor 11 non-conductive, a fixed potential is applied across terminals 22 and 23 and thus across lamp 17. Condenser 19 will thus be charged and the voltage thereacross and across lamp 17 will, for the examples of potential levels chosen, be around sixty-seven volts. This potential is thus insufficient to fire or ignite lamp 17. When a signal is applied over line 15 to cause transistor 11 to conduct, the potential at collector 14 assumes the potential of emitter 12, namely ground, and a voltage drop is then produced across resistor 16. With collector 14 at ground potential, a potential of seventy-seven volts is applied across lamp 17 and condenser 19 through resistor 18. Thus, lamp 17 will ignite. When lamp 17 ignites, condenser 19 discharges through lamp 17 until the potential across the condenser and lamp drops to the extinguishing potential of lamp 17 at which time lamp 17 extinguishes and condenser 19 begins to again charge toward seventy-seven volts. It should be noted that the extinguishing potential of lamp 17 is thus not critical with respect to any of the voltage levels involved. As the charge in condenser 19 reaches about seventy-six volts, lamp 17 again ignites to again discharge condenser 19. This process of ignition and extinguishing of lamp 17 continues until transistor 11 is made non-conductive by the removal of the negative signal on line 15. It will be recalled that when transistor 11 is non-conductive, the potential of collector 14 is at the minus ten volt level. With this condition the voltage across lamp 17 can go no higher than sixty-seven volts which is insufficient to ignite lamp 17.

It may thus be seen that with transistor 11 conducting the voltage drop across resistor 16 augments or aids the fixed potential across terminals 22 and 23 to fire or ignite lamp 17. Lamp 17 is extinguished by the discharge of condenser 19 therethrough and is prevented from again igniting when the voltage drop across resistor 16 is removed by cutting transistor 11 "off."

It should be apparent that the potential levels may be provided as desired to cause the indicator to indicate in a desired manner. For example, if the potential at terminal 23 were made around sixty-seven volts positive with respect to ground, lamp 17 would ignite when transistor 11 is in the non-conductive state and remain extinguished when transistor 11 is conductive. In this event, the voltage drop across resistor 16 would augment the potential of terminal 23 in a subtractive sense.

The value of resistor 18 and the value of condenser 19 may be so chosen that the frequency of oscillation of oscillator 20 is sufficiently high to prevent the flicker of lamp 17 being noticeable to the human eye. On the other hand, if a flicker in the visual indicating device is not objectionable the values of the components need not be so chosen.

It is thus seen that lamp 17 provides a visual indication of the electrical state of transistor 11.

While there have been shown and described and pointed out the fundamental novel features of the invention as applied to a preferred embodiment, it will be understood that various omissions and substitutions and changes in the form and details of the device illustrated and in its operation may be made by those skilled in the art, without departing from the spirit of the invention. It is the intention, therefore, to be limited only as indicated by the scope of the following claim.

What is claimed is:

A visual indicator comprising a glow discharge lamp, a resistor connected in series with said lamp to form a series circuit with said lamp, a source having a potential less than the ignition potential of said lamp connected across said series circuit, means for conducting a current through said resistor to produce a potential drop thereacross of a polarity and magnitude effective to increase the potential across said lamp above the potential required to ignite said lamp, and means for producing voltage oscillations across said lamp when the potential across said lamp reaches a potential sufficient to ignite said lamp whereby said lamp is alternately ignited and extinguished when said conducting means produces a potential drop across said resistor.

References Cited in the file of this patent

UNITED STATES PATENTS

| | | |
|---|---|---|
| 2,073,359 | Witts | Mar. 9, 1937 |
| 2,772,410 | Logue et al. | Nov. 27, 1956 |
| 2,776,420 | Woll | Jan. 1, 1957 |
| 2,829,257 | Root | Apr. 1, 1958 |
| 2,920,239 | Saeger | Jan. 5, 1960 |

FOREIGN PATENTS

| | | |
|---|---|---|
| 863,092 | Germany | Jan. 15, 1953 |

OTHER REFERENCES

Text: "Electron-Tube Circuits," by S. Seely, page 443, published in 1950 by McGraw-Hill Co., Inc.